(12) United States Patent
Hand et al.

(10) Patent No.: US 12,709,378 B2
(45) Date of Patent: Aug. 18, 2026

(54) AIRCRAFT PANEL

(71) Applicant: Airbus Operations Limited, Bristol (GB)

(72) Inventors: Matthew Hand, Bristol (GB); Cameron James Russell, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 18/955,413

(22) Filed: Nov. 21, 2024

(65) Prior Publication Data

US 2025/0162705 A1 May 22, 2025

(30) Foreign Application Priority Data

Nov. 22, 2023 (GB) ..................................... 2317856

(51) Int. Cl.
*B64C 3/26* (2006.01)
*B64C 1/00* (2006.01)
*B64F 5/10* (2017.01)

(52) U.S. Cl.
CPC .................. *B64C 3/26* (2013.01); *B64F 5/10* (2017.01); *B64C 2001/0072* (2013.01)

(58) Field of Classification Search
CPC .............. B64C 3/26; B64C 3/546; B64C 3/56
See application file for complete search history.

(56) References Cited

U.S. PATENT DOCUMENTS 2,881,994 A * 4/1959 Michael .................... B64C 3/26 244/132
7,357,353 B2 * 4/2008 Stephens ................... B64C 3/18 244/123.3
7,975,965 B2 * 7/2011 Ackermann .......... B64C 23/069 244/131
11,022,093 B2 6/2021 Bech
2009/0218442 A1 9/2009 McAlinden et al.
2013/0344291 A1 * 12/2013 Pearson ................ B29C 70/462 156/212
2014/0299257 A1 10/2014 Pearson et al.
2016/0052233 A1 2/2016 Kaigome et al.
2021/0115953 A1 4/2021 Hashizume
2022/0024558 A1 1/2022 Horwood et al.

FOREIGN PATENT DOCUMENTS

EP 1 595 787 B1 12/2017
GB 2601768 A 6/2022
JP 4082727 B2 2/2008
JP 3161322 U 7/2010
JP 2013203004 A 10/2013
JP 5529692 B2 4/2014

OTHER PUBLICATIONS

Search Report for Application No. GB2317856.9, dated Apr. 23, 2024, 4 pages.
Extended European Search Report for Application No. 24207720.4, eight pages, dated Mar. 3, 2025.

* cited by examiner

*Primary Examiner* — Nicholas McFall
*Assistant Examiner* — Eric Acosta
(74) *Attorney, Agent, or Firm* — Nixon & Vanderhye, PC

(57) ABSTRACT

An aircraft panel is disclosed having a ply of composite material, the ply of composite material curved around an axis such that a free end of the ply extends more than 180 degrees around the axis and defines a wall of a channel for receiving a hinge member of an aircraft component.

15 Claims, 4 Drawing Sheets

AIRCRAFT PANEL

CROSS RELATED APPLICATION

This application claims priority to United Kingdom Patent Application GB 2317856.9, filed Nov. 22, 2023, the entire contents of which is hereby incorporated by reference.

TECHNICAL FIELD

The present invention relates to aircraft panels, to aircraft and aircraft assemblies comprising aircraft panels, and to methods of manufacturing aircraft panels.

BACKGROUND

Aircraft aerodynamic surfaces, such as wing skins, fuselages, and control surfaces, are typically formed from panels of material. The panels are connected to other panels, or other structures of the aircraft, such as wing ribs.

SUMMARY

A first aspect of the present invention provides an aircraft panel comprising a ply of composite material, the ply of composite material curved around an axis such that a free end of the ply extends more than 180 degrees around the axis and defines a wall of a channel for receiving a hinge member of an aircraft component.

Forming the channel from the ply may provide a channel that is integrally formed with the aircraft panel, for example by simply bending the free end of the ply around the axis to form the channel. An aircraft panel with such an integrally formed channel may have improved resilience to stress than, for example, an aircraft panel comprising a discrete channel connected to the aircraft panel. In particular, such an integrally formed channel may better distribute stress throughout the aircraft panel compared to a discrete channel, which may transmit stress to the panel through connecting parts between the aircraft panel and a discrete channel, such as welds, or bolts.

This may provide a stronger aircraft panel than a panel that is to be connected to the aircraft component in another way, such as by drilling holes for bolts in the panel. For instance, providing the channel may avoid stresses that might otherwise be present in connecting components (e.g., welds or bolts) for connecting the aircraft panel and the aircraft component.

Moreover, providing the channel formed by the ply of composite material may be lighter than an aircraft panel comprising a discrete channel, which as noted above may require additional connecting parts to connect the discrete channel to the aircraft panel.

By extending more than 180 degrees around the axis, the free end of the ply may be better able to restrict a radial movement of the hinge member in the channel than if the free end extended less than 180 degrees around the axis.

Optionally, the aircraft panel comprises an outer surface, the outer surface comprising: a first portion that extends in a direction orthogonal to the axis; a second portion that is curved around the axis; and a transition region between the first portion and the second portion. Optionally, the transition region defines a curve between the first portion and the second portion, and there is no inflection point in the curve when viewed along the axis.

Providing the transition region absent any inflection points in the curve defined by the transition region may reduce a number of changes of direction encountered by fibres in the aircraft panel compared to a curve that has an inflection point. This may provide a more uniform distribution of tensile load through the fibre, and thereby provide a stronger aircraft panel.

Optionally, at least part of the outer surface forms an aerodynamic surface of the aircraft panel. The aerodynamic surface may be exposed to air passing over the panel, in use. Ensuring there is no inflection point in the curve defined by the transition region may reduce a number of changes in direction of the outer surface, particularly in the transition region, which may provide a more aerodynamically efficient surface compared, for example, to a surface comprising more than one change in direction in the transition region surface. Optionally, the first portion of the outer surface forms an aerodynamic surface of the aircraft panel. Optionally, the aerodynamic surface comprises at least part of the transition region.

Optionally, the ply of composite material defines the outer surface. In this way, the same ply is used to define both the outer surface of the aircraft panel and the wall of the channel, which may provide a construction that is easy to manufacture. Optionally, the ply of composite material defines an outer surface of the channel.

Optionally, the second portion of the outer surface is convex around the axis. This may provide an outer surface that curves away from (rather than in to) a mean flow of air over the outer surface, in use, which may provide an aerodynamically efficient aircraft panel. Optionally, an outer surface of the free end comprises the second portion.

Optionally, the channel is defined at an edge of the aircraft panel. This may provide a convenient way to connect the aircraft panel to the aircraft component. This may also provide an aircraft panel that is easy to manufacture. For instance, the channel may readily be formed by placing a mandrel in proximity to the free end of the ply and curving the ply around the axis so that the free end of the ply defines the wall of the channel. Moreover, the channel may be formed as part of the manufacturing process of the aircraft panel itself, which may lead to an efficient manufacturing process.

Optionally, the axis extends parallel to the edge of the panel. Optionally, the channel defines the edge of the panel. Optionally, the channel extends along the axis and up to a further edge adjacent to the edge of the panel. This may provide easy access to the channel for inserting the hinge member.

Optionally, the ply is curved around the axis such that the free end extends at least 270 degrees around the axis. Increasing an extent to which the free end extends around the axis may provide a stronger channel.

Optionally, the ply curves around the axis to an extent such that a line extending normal to an outer surface of the ply at the free end, when viewed along the axis, extends in a direction that has a component towards the ply. Optionally, the ply curves around the axis to provide a closed channel. In this way, the wall of the channel may fully encircle the channel, and so the channel may be better able to retain the hinge part therein.

Optionally, the ply is curved around the axis such that the free end extends at least 360 degrees around the axis. Providing the free end extending at least 360 degrees around the axis may provide a channel that is resistant to stresses in a radial and/or tangential direction around a full periphery of the channel. Optionally, the first ply forms a spiral shape when viewed along the axis, which may improve a strength of the channel.

Optionally, the aircraft panel comprises further plies of composite material in a laminated arrangement with the ply. Providing the ply in a laminated arrangement with the further plies in the aircraft panel may lead to a strong aircraft panel, whereby stresses in the ply (such as due to movement of the hinge member when it is received in the channel) may be distributed to the at least one further ply in the aircraft panel.

Optionally, one of the further plies is curved around the axis in a region radially outward from the axis relative to the ply, and is in contact with the ply in the region. This may reinforce the channel, such as to improve a resilience of the channel to stresses in a radial and/or circumferential direction in the channel.

Optionally, each of a plurality of the further plies is curved around the axis in the region radially outward from the axis relative to the ply, and is in contact with another of the plurality of further plies in the region. Providing more plies may further improve a resilience of the channel to stresses in a radial and/or circumferential direction in the channel.

Optionally, each ply of composite material in the laminated arrangement defines one or more layers of composite material in the aircraft panel, and wherein one of the further plies comprises a first portion, a second portion, and a curved portion that curves around the axis between the first portion and the second portion in the region, wherein the first and second portions form respective layers of the one or more layers in the aircraft panel.

In this way, stresses in the one of the further plies may be distributed to layers of composite material that are adjacent to each of the first portion and the second portion. This may increase a number of layers to which stress can be distributed from the at least one of the further plies compared to an example where the one of the further plies forms only a single layer in the panel. As such, and because the curved portion is in contact with the ply in the region, the one of the further plies may better distribute stress experienced by the channel to other layers in the aircraft panel. This may improve a strength of the one of the further plies and/or the channel.

The one of the further plies may form the outer surface of the aircraft panel. Optionally, the first portion extends substantially in a direction orthogonal to the axis. Optionally, the aircraft panel comprises a plurality of the further plies, each of the plurality of further plies comprising a respective first portion, a respective second portion and a respective connecting portion, the connecting portion of each of the plurality of further plies curving around the axis between the respective first portion and the respective second portion in the region, wherein the first and second portions of each of the plurality of further plies form respective layers in the aircraft panel. Increasing a number of the plurality of the further plies in the aircraft panel may improve a strength of the aircraft panel.

Optionally, one of the further plies is curved around the axis in contact with the ply such that a free end of the one of the further plies extends more than 180 degrees around the axis.

Providing the free end of the one of the further plies extending at least 180 degrees around the axis in contact with the ply may provide a channel that is more resistant to stresses applied to the channel. Optionally, the free end of the one of the further plies defines a further wall of the channel.

Optionally, one of the further plies has a length in a direction orthogonal to the axis, and the ply is longer than the one of the further plies in the direction orthogonal to the axis.

In this way, the ply may be provided so that the first portion of the ply extends along a full length of the one of the further plies in the direction orthogonal to the axis, while still forming the channel. Increasing an extent to which the ply extends along the length of the one of the further plies in the orthogonal direction may increase a surface area of the ply in contact with the one of the further plies, leading to a stronger aircraft panel.

Optionally, the free end of the ply comprises cut-outs such that the channel comprises discrete channel elements spaced apart along the axis. Providing spaced-apart channels along a length of the axis may reduce a weight of the composite panel compared to an aircraft panel comprising a single channel extending along the length of the axis.

Optionally, the ply of composite material comprises fibres aligned in a direction of curvature of the ply around the axis. This may provide a channel that is resistant to radial and/or tangential stress.

Optionally, the ply of composite material comprises a composite fibre sheet. This may provide a resilient and lightweight aircraft panel. Optionally, each ply in the aircraft panel comprises a composite fibre sheet. Optionally, the aircraft panel is a fibre-reinforced composite panel. Optionally, the composite panel is a carbon-fibre reinforced composite panel or a glass-fibre reinforced composite panel.

A second aspect of the present invention provides an aircraft assembly comprising: the aircraft panel of any one of claims 1 to 12; and the aircraft component comprising the hinge member. The hinge member is located in the channel to connect the aircraft component to the aircraft panel.

It will be appreciated that the XX aspect of the present invention may comprise and/or benefit from any of the optional features and/or advantages of the first aspect of the present invention.

Optionally, the aircraft assembly is a wing assembly or a tail plane assembly.

A third aspect of the present invention provides an aircraft wing comprising the aircraft panel of the first aspect or the aircraft assembly of the second aspect, wherein the aircraft panel forms an aerodynamic surface of the wing.

The aircraft panel may form a skin of the wing. Optionally, the wing comprises a main wing portion and a wing tip connected to the main wing portion. Optionally, the aircraft panel forms part of a skin of a wing tip. Optionally, the aircraft component is a panel of the main wing portion. This may provide a compact and lightweight way to connect the wing tip to the main wing portion. Optionally, the panel is articulatable about the hinge member in the channel, such that the wing tip is articulatable relative to the main wing portion.

Alternatively, the panel may form a part of the main wing portion of the wing and the aircraft component may comprise a fuselage of the aircraft. In this way, the channel may provide a secure and compact way to connect the wing to the fuselage. Alternatively, the aircraft panel may comprise a flight control surface of the aircraft. In that case, the aircraft component may, for instance, comprise a wing structure of the aircraft and/or an actuator for actuating the control surface. While the XX aspect relates to a wing of the aircraft, the panel may be a panel of any other aerodynamic surface of the aircraft, such as a tail plane or fuselage.

It will be appreciated that the aircraft wing of the third aspect of the present invention may comprise and/or benefit from any of the optional features and/or advantages of the first or second aspects of the present invention.

A fourth aspect of the present invention provides an aircraft comprising the aircraft panel the first aspect, the aircraft assembly of the second aspect, or the wing of third aspect. Optionally, the aircraft comprises a fuselage, and the aircraft component is the fuselage. In this way, particularly when the aircraft panel forms an aerodynamic surface (such as a skin) of the wing, the aircraft panel may be connected to the fuselage.

It will be appreciated that the aircraft of the fourth aspect of the present invention may comprise and/or benefit from any of the optional features and/or advantages of any of the first to third aspects of the present invention.

A fifth aspect of the present invention provides a method of manufacturing an aircraft panel, the method comprising; providing a ply of composite material; and curving the ply of composite material around an axis such that a free end of the ply extends more than degrees around the axis and defines a wall of a channel for receiving a hinge member of an aircraft component.

This may provide a convenient way to manufacture the composite panel while providing a strong channel for connecting the aircraft panel to the aircraft component, as described above.

Optionally, the method comprises curving the ply of composite material around the axis such that the free end extends at least 270 degrees around the axis. Optionally, the method comprises curving the ply of composite material around the axis so to provide a closed channel.

Optionally, the method comprises curving the ply of composite material around the axis such that the free end extends at least 360 degrees around the axis. In this way, the free end may define a full circumference of the wall of the channel. Increasing an extent to which the free end extends around the axis may improve a strength of the channel. Optionally, the method comprises curving the ply more than one full turn around the axis, which may further improve a strength of the channel.

Optionally, the curving the ply of composite material comprises curving the ply around a mandrel. Optionally, the method comprises removing the mandrel from the channel.

Optionally, the method comprises providing a plurality of plies of composite material and curving each of the plurality of plies of composite material around the axis such that a free end of each of the plurality of plies extends more than 180 degrees around the axis.

Optionally, the method comprises providing a base ply in a laminated arrangement with the ply. Optionally, the method comprises providing the ply so that a portion of the ply comprising the free end overhangs the base ply in the laminated arrangement. Optionally, the curving the ply around the axis comprises curving the portion of the ply overhanging the base ply around the axis. In this way, the channel may define an edge of the aircraft panel. Optionally, the method comprises curving the portion of the ply overhanging the base ply around the mandrel to form the channel.

Optionally, the method comprises forming the ply and/or the base ply such that the ply is longer than the base ply in a direction orthogonal to the axis. The ply and base ply may initially be the same length in a direction orthogonal to the axis, and the method may comprise cutting, or otherwise removing more material from the base ply than from the ply so that the ply is longer than the base ply in the direction orthogonal to the axis.

Optionally, the method comprises: providing a further ply in a laminated arrangement with the ply; curving the ply around the axis to form the channel such that the ply comprises a first portion extending along a further axis orthogonal to the axis, and a curved portion curved around the axis; and curving the further ply around the axis so that the further ply comprises a first portion extending along the further axis, a curved portion curved around the axis, and a second portion extending along the further axis, and so that the first portion of the ply is located between the first and second portions of the further ply.

Optionally, the method comprises curving the ply and the further ply around the axis, such as around the mandrel, simultaneously. This may provide a speedy manufacturing process. Alternatively, the further ply may be curved around the axis after the ply has been curved around the axis.

Optionally, the method comprises providing a plurality of further plies in a laminated arrangement with the first ply. Optionally, the method comprises curving the plurality of further plies around the axis so that each of the plurality of further plies comprises a respective first portion extending along the further axis, a respective curved portion curved around the axis, and a respective second portion extending along the further axis, and so that the first portion of the ply is located between the respective first and second portions of each ply. Optionally, the method comprises curving each of the plurality of further plies simultaneously with one other and/or simultaneously with curving the ply. Alternatively, the method may comprise curving one or more of the plurality of further plies after curving another one of the further plies, and/or after curving the ply.

Optionally, the method comprises providing a wedge to separate the further ply from the ply as the further ply is curved around the axis.

The wedge may cause the second portion of the further ply to pass along the further axis, rather than around the axis, during the manufacturing process. The wedge may be shaped so as provide a more gradual change in curvature of the further ply between the curved portion of the further ply and the second portion of the further ply than without the wedge. This may provide straighter fibres in the further ply, which may improve a strength of the further ply and the aircraft panel as a whole.

Optionally, the method comprises removing material from the ply to form a plurality of channel elements spaced apart along the axis. This may provide a lighter aircraft panel than an aircraft panel comprising a single, longer channel.

Optionally, the forming the plurality of channel elements comprises curving the ply around the axis to form the channel, and removing segments of the channel to form the plurality of channel elements. This may be by cutting the channel to remove the segments. Forming the spaced-apart channel elements from a longer single channel may provide a convenient way to manufacture the aircraft panel.

Alternatively, the forming the plurality of channel elements may comprise forming the ply of composite material so that the free end forms a nonlinear pattern, such as a castellated pattern, when viewed in a direction orthogonal to the ply. This may cause the plurality of channel elements to be formed when the free end is wrapped around the axis.

Optionally, the polymerising the aircraft panel comprises applying a resin, such as a polymeric resin, to the or each ply of the aircraft panel. Alternatively, the or each ply in the aircraft panel may be pre-impregnated with the resin. The method may comprise heating the aircraft panel, applying a pressure to the aircraft panel and/or applying a vacuum to the aircraft panel, to cause the resin to cure.

It will be appreciated that the method of the fifth aspect of the present invention may comprise and/or benefit from any of the optional features and/or advantages ascribed to any of the first to fourth aspects of the present invention.

A sixth aspect of the present invention provides an aircraft panel manufactured according to the method of the fifth aspect of the present invention.

The aircraft panel of the sixth aspect of the present invention may comprise and/or benefit from any of the optional features and/or advantages of any of the first to fifth aspects of the present invention.

BRIEF DESCRIPTION OF THE DRAWINGS

Embodiments of the invention will now be described, by way of example only, with reference to the accompanying drawings, in which.

DETAILED DESCRIPTION

Figure 1:
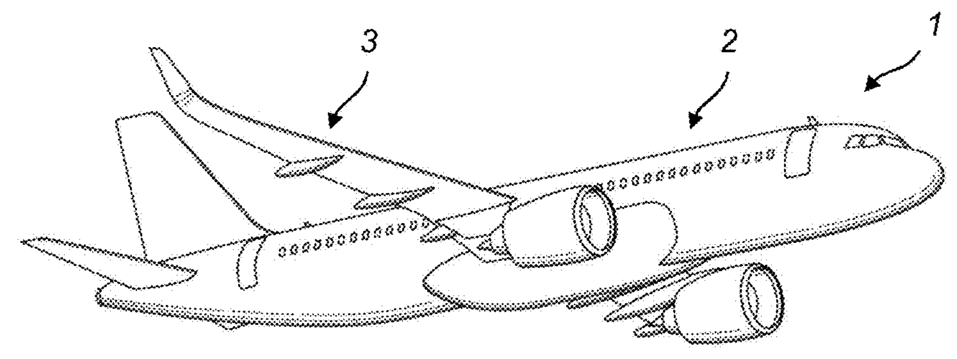
FIG. 1 shows a schematic view of an example aircraft.

FIG. 1 shows an example aircraft 1 that comprises a fuselage 2 and a wing 3 extending from the fuselage 2. The wing 3 is shown in more detail in FIG. 2 and comprises a main wing portion 4, a wing tip 5 and a panel 10 that forms a part of a skin of the wing tip 5, i.e., an aerodynamic surface of the wing tip 5. The aircraft 1 also comprises a pin joint 20 that connects the panel 10 to a main wing panel 30 of the main wing portion 4. The pin joint 20 defines a joint axis 25 around which the panel 10 can articulate so that the wing tip 5 is foldable relative to the main wing portion 4.

Figure 2:
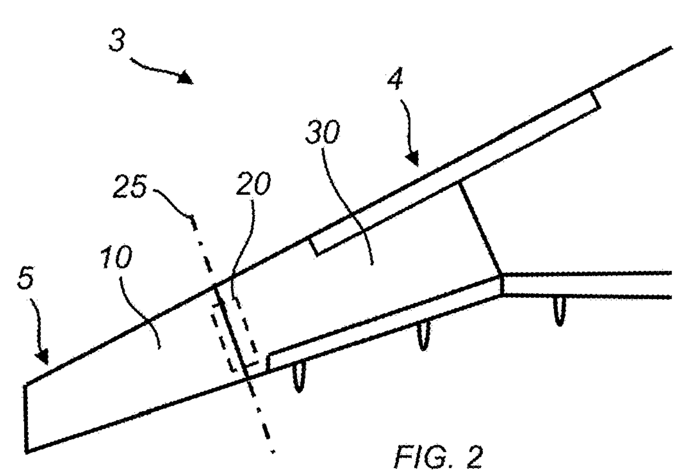
FIG. 2 shows a top-down schematic view of a wing of the aircraft.
Figure 3:
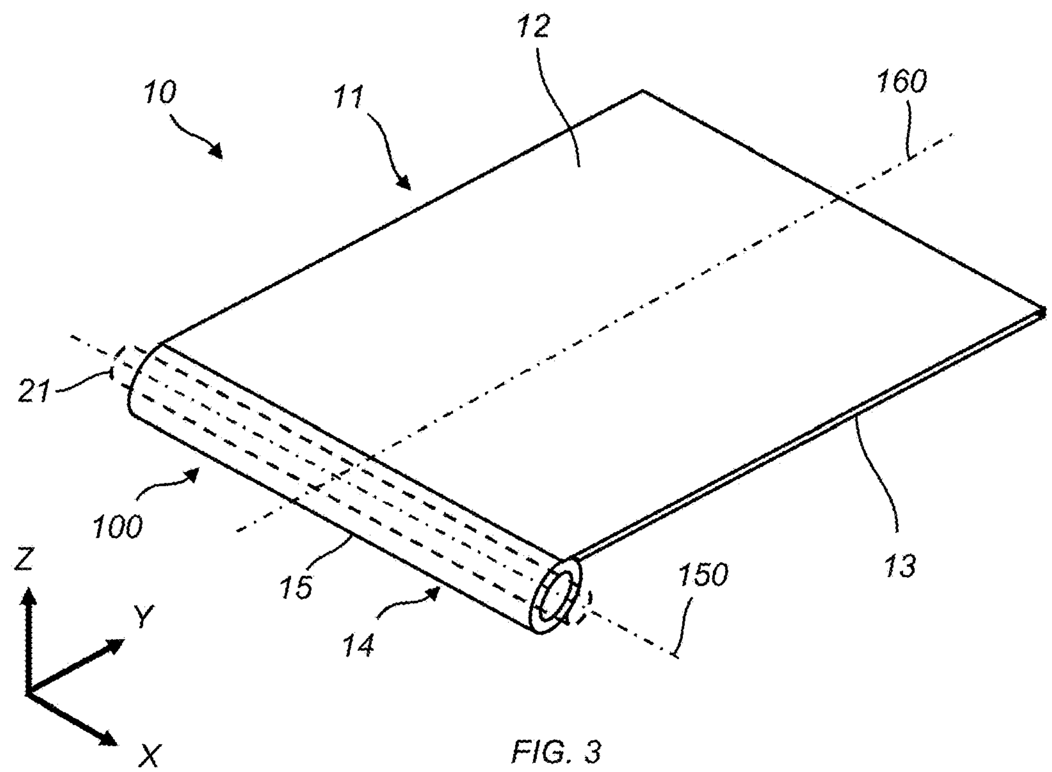
FIG. 3 shows a schematic view of an example panel of the wing of FIG. 2.

As shown in FIGS. 2 and 3, the panel 10 comprises a planar portion 11 and a channel 100 at an end 14 of the panel 10. The planar portion 11 comprises an upper surface 12 forming a skin of the wing tip 5 and a lower surface 13 on an opposite side of the panel 10 to the upper surface 12. The panel 10 also comprises a curved surface 15 extending around the channel 100 between the upper surface 11 and the lower surface 13. The curved surface 15 defines the end 14 of the panel, and the channel extends continuously across a full width of the panel 10 in the direction of the channel axis 150.

To connect the panel 10 to the main wing panel 30, the pin joint 20 comprises a cylindrical hinge member 21 that extends through the channel 100 along a channel axis 150 of the channel 100. The channel axis 150 is aligned with the joint axis 25. The pin joint 20 also comprises lugs 22 connecting the hinge member 21 to the main wing panel 30 at either end of the hinge member 21.

Figures 4, 5:
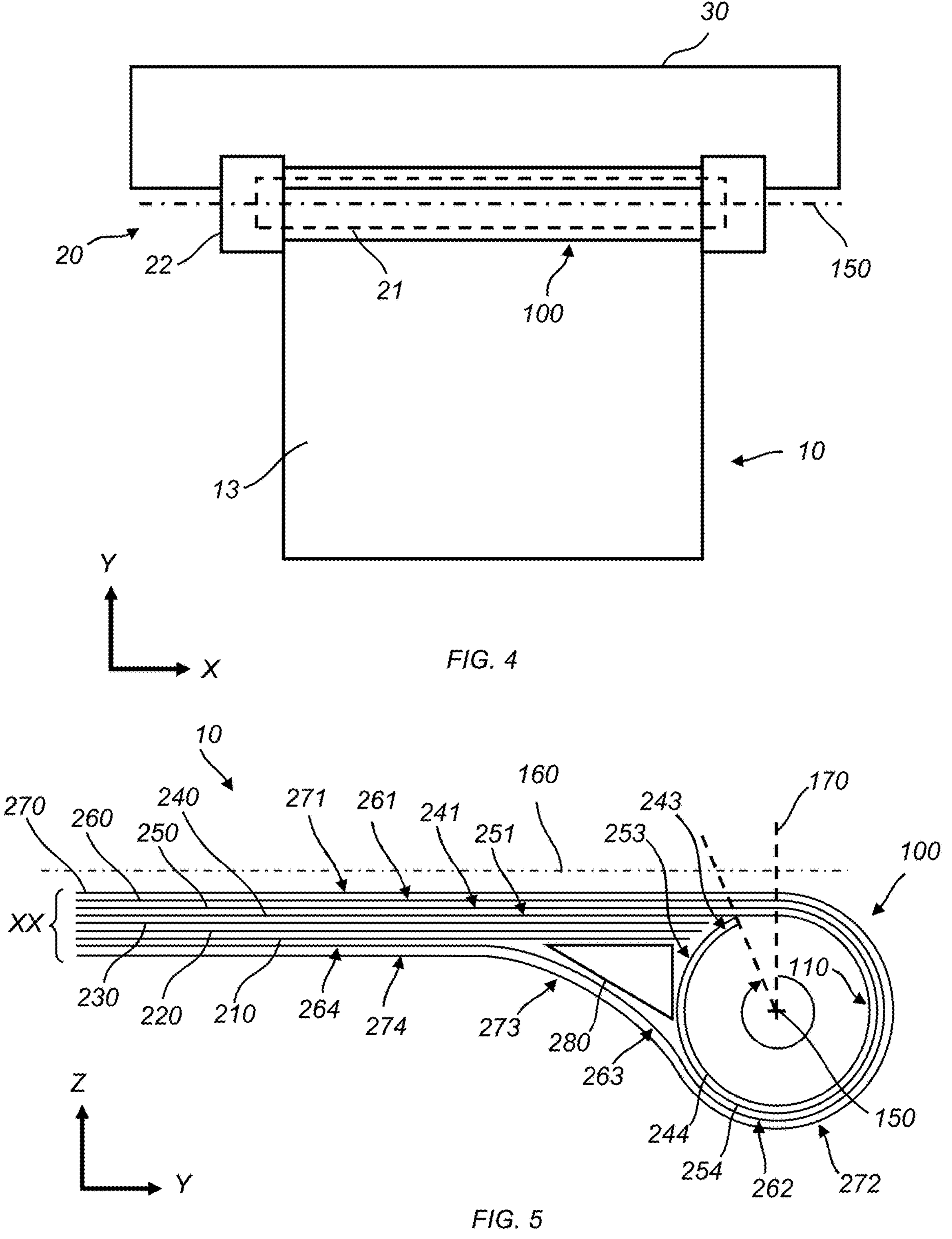
FIG. 4 shows a planar schematic view of the panel of FIG. 3.
FIG. 5 shows side-on schematic view of the panel of FIG. 3.

As best shown in FIG. 5, the panel 10 is a composite panel comprising plies of composite material in a laminated arrangement 200. Each ply is represented by a single line in FIG. 5 The panel 10 in particular comprises: first, second, and third base plies 210, 220, 230, first and second channel plies 240, 250 on the first second and third base plies 210, 220, 230 and first and second surrounding plies 260, 270 on the first and second channel plies 240, 250. Each of the first to third base plies 210, 220, 230 extends parallel to a longitudinal axis 160 that is orthogonal to the channel axis 150. The channel axis 150 here extends in an x-direction of the panel 10, while the longitudinal axis 160 extends in a y direction of the panel 10. Each of the first and second surrounding plies 260, 270 is longer than each of the first and second channel plies 240, 250, which in turn are each longer than each of the base plies 210, 220, 230.

The first and second channel plies 240, 250 comprise respective first and second longitudinal portions 241, 251 that extend parallel to the longitudinal axis 160, and respective first and second channel portions 242, 252 that curve around the channel axis 160 and form the channel 100.

The first and second channel portions 242, 252 comprise respective first and second free ends 243, 253 of the respective first and second channel plies 240, 250. The first and second channel portions 242, 252 are each curved around the channel axis 150 such that the respective first and second free ends 243, 253 extend 335 degrees around the channel axis 150. More specifically, the first and second free ends 243, 253, when viewed along the channel axis 150, each subtend an angle of 335 degrees around the axis 150 from an origin axis 170 that passes through the channel axis 150 and is orthogonal to both the channel axis 150 and the longitudinal axis 160. In this way, the first free end 243 of the first channel ply 240 defines a wall 110 of the channel 100. An outer surface 244 of the first free end 243 is convex and loops around the channel axis 150 and contacts the first longitudinal portion 241 of the first channel ply 240. The channel 100 is thereby closed around the channel axis 150. The base plies 210, 220, 230 each extend up to (but do not contact) an outer surface 254 of the second free end 253 of the second channel ply 250.

The first and second surrounding plies 260, 270 comprise respective first and second overlying portions 261, 271 extending parallel to the longitudinal axis 160 and respective first and second underlying portions 264, 274 extending parallel to the longitudinal axis 160. The first and second overlying portions 261, 271 and the first and second underlying portions 264, 274 are "overlying" and "underlying" in the context of the orientation shown in FIG. 5, where the z-direction is in an upward direction. The first surrounding ply 260 also comprises a first curved portion 262 extending around the channel axis 150 between the first overlying portion 261 and the first underlying portion 264. The second surrounding ply 270 comprises a second curved portion 272 extending around the channel axis 150 between the second overlying portion 271 and the second underlying portion 174. The first to third base plies 210, 220, 230 and the first and second longitudinal portions 241, 251 of the respective first and second channel plies 240, 250 are each located between the first overlying portion 261 and the first underling portion 264, and between the second overlying portion 271 and the second underlying portion 274, in the laminated arrangement 200.

The first and second surrounding plies 260, 270 also comprise respective first and second transition portions 263, 273 between the respective first and second curved portions 262, 272 and the respective first and second underlying portions 264, 274. The aircraft panel 10 also comprises a forming wedge 280 that constrains a shape of the first and second surrounding plies 260, 270. In particular, the forming wedge 280 limits an extent to which the first and second curved portions 262, 272 extend around the channel axis 150, to provide a more gradual change in curvature of the first and second transition portions 263, 273 towards the respective first and second underlying portions 264, 274.

The second overlying portion 271 defines the upper surface 12 of the aircraft panel 10, and the second curved portion 272 forms the curved surface 15 of the panel 10. The second surrounding panel 270 is formed such that there is no inflection point in a curve extending along the upper surface 12 and around the curved surface 15 of the of aircraft panel 10 when viewed along the channel axis 150. In particular, with respect to the orientation shown in FIG. 5, there is no upward protrusion of the upper surface 12 or the curved surface 15 in a z-direction of the panel 10 orthogonal to both the x- and y-directions, such as into a free stream of air passing over the upper surface 12, in use. The curve extending along the upper surface 12 and the curved surface 15 extends only horizontally in the y-direction, parallel to the longitudinal axis 160, and then downwardly in a (negative) z-direction to curve around the channel axis 150. This may provide an aerodynamically efficient panel.

Each ply in the panel 10 is a carbon fibre ply having fibres that extend substantially parallel to the longitudinal axis in the planar portion 11 of the panel 10. Fibres in the first and second channel portions 242, 252 of the respective first and second channel plies 240, 250, and fibres in the first and second curved portions 262, 272 of the respective first and second outer plies 260, 270, then also extend around the channel axis 150. The fibres are each resilient to stress in a length direction of the fibres. As such, passing the fibres parallel to the longitudinal axis 160 and around the channel axis 150 provides an integral channel that is resilient to radial and/or tangential stresses that cause the fibres to stretch.

Figure 6:
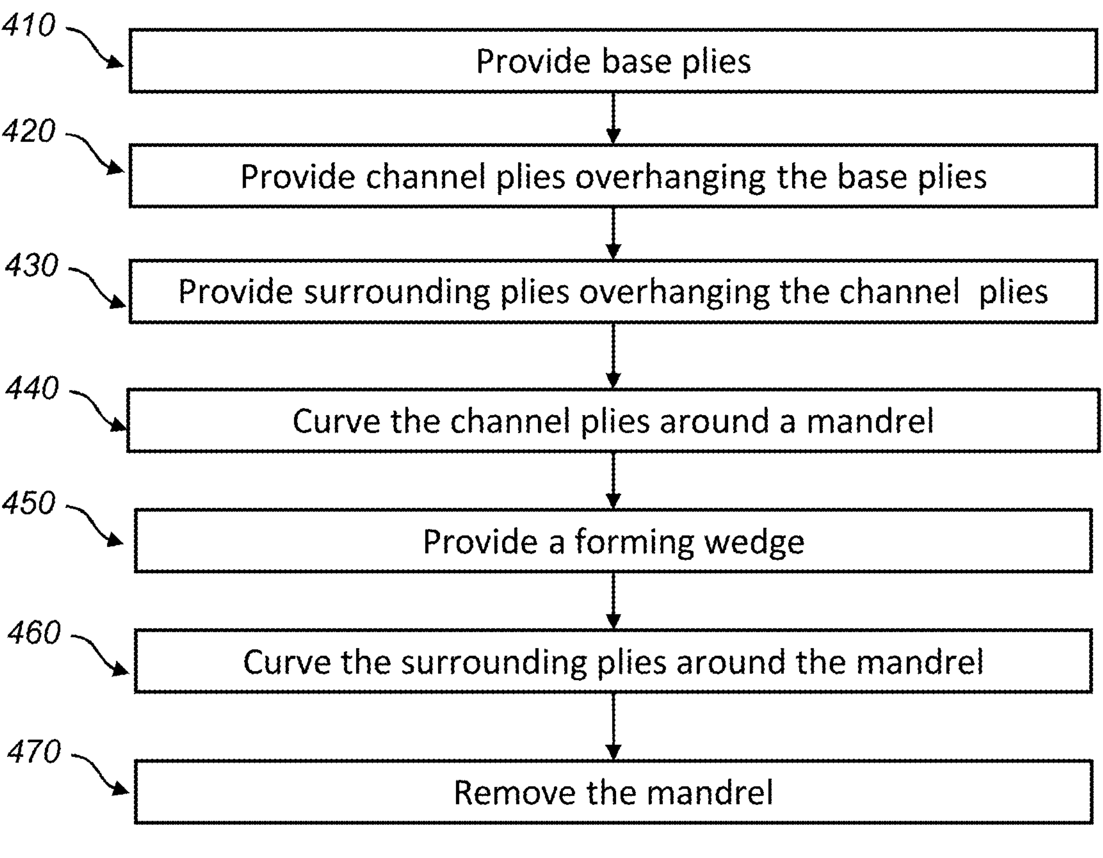
FIG. 6 shows an example method of manufacturing the panel of FIGS. 3 to 5.
Figure 7:
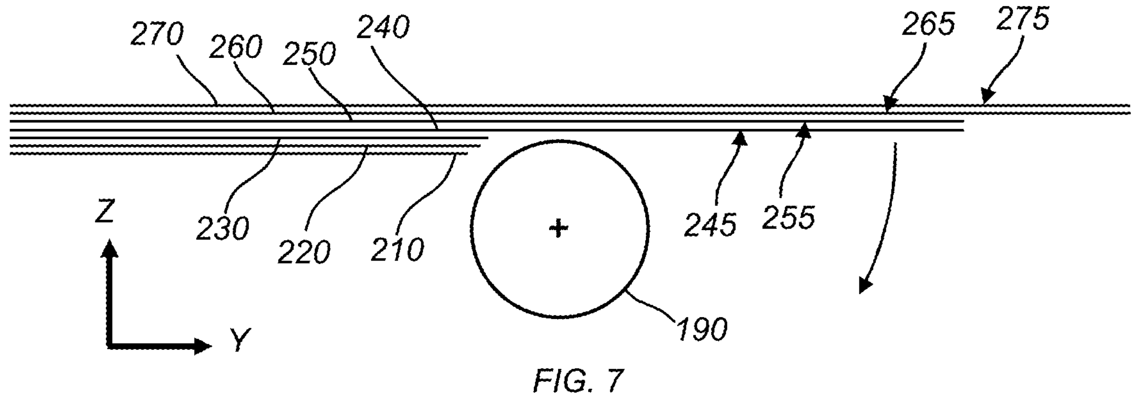
FIGS. 7 and 8 show schematic views at stages in the method of manufacturing shown in FIG. 6.
Figure 8:
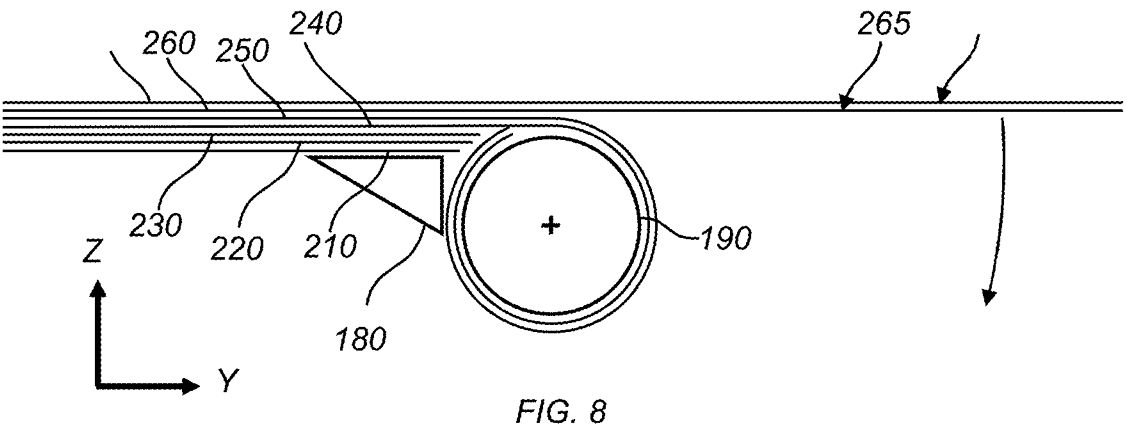

FIG. 6 shows an example method 400 of manufacturing the panel 10, while FIGS. 7 and 8 show the aircraft panel 10 at different stages during manufacture. The method comprises providing 410 the first to third base plies 210, 220, 230, and providing 420 the first and second channel plies 240, 250 in the laminated arrangement 200 overlying the first to third base plies 210, 220, 230, such that first and second overhang portions 245, 255 of the first and second channel plies 240, 250 overhang each of the first to third base plies 210, 220, 230. The method 400 also comprises providing 430 the first and second surrounding plies 260, 270 in the laminated arrangement 200 overlying the first and second channel plies 240, 250, such that first and second overhang portions 265, 275 of the respective first and second surrounding plies 260, 270 overhang each of the first and second channel plies 240, 250. This arrangement is shown in FIG. 7. The method 400 comprises curving 440 the first and second overhang portions 245, 255 of the respective first and second channel plies 240, 250 around a mandrel 190 aligned with the channel axis 150, such that the first and second free ends 243, 253 of the first and second channel plies 240, 250 extend 335 degrees around the channel axis 150, and such that the first free end 243 of the first channel ply 240 defines the wall 110 of the channel 100.

The method 400 comprises providing 450 the forming wedge 180 adjacent to the first base ply 210 and the outer surface 254 of the second free end 253 of the second channel ply 250, as shown in FIG. 8. The method 400 then comprises curving 460 the first and second overhang portions 265, 276 of the respective first and second surrounding plies 260, 270 around the first and second channel portions 242, 252 of the respective first and second channel plies 240, 250 and the mandrel 190. The forming wedge 180 separates the first and second surrounding plies 260, 270 from the first and second curved portions 242, 252 of the first and second channel plies 240, 250 as the first and second surrounding plies 260, 270 are curved around the mandrel 190. This causes the first and second underlying portions 264, 274 of the respective first and second surrounding plies 260, 270 to extend away from the channel axis 150 parallel to the longitudinal axis 160.

The method 400 then comprises removing 470 the mandrel 190 from the channel 100. This provides the structure described above with reference to FIG. 5.

Figure 9:
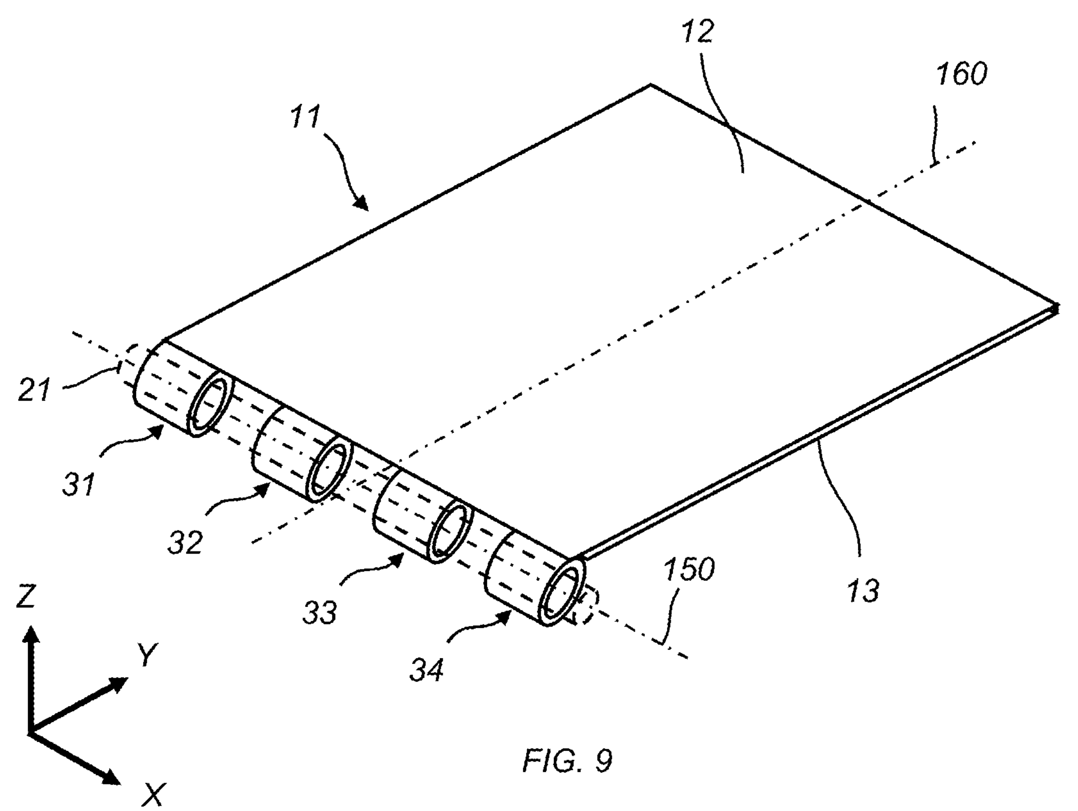
FIG. 9 shows an alternative panel.

FIG. 9 shows a schematic view of an alternative panel 40. The alternative panel 40 is substantially the same as the panel 10 described above, and so like portions have been given like reference numerals in the Figures. The alternative panel 40 differs from the panel 10 in that, rather than the channel 100, the alternative panel 40 comprises four discrete channel elements 31, 32, 33, 34 spaced apart along the channel axis 150. The hinge member 21 is received through each of the channel elements 31, 32, 33, 34 to connect the alternative panel 40 to the fuselage 2. Providing plural spaced apart channel elements 31, 32, 33, 34 may reduce a weight of the alternative panel 40 compared to the panel 10 described above, while still providing the benefits of a resilient integral channel.

The alternative panel 40 can be manufactured in much the same way as in the method 400 of manufacturing the panel 10 described above. In addition to the actions of the method 400 of manufacturing the panel, the alternative method of manufacturing the alternative panel 40 comprises, following the removing 470 the mandrel from the channel 100, removing material from the first and second channel plies 240, 250 and the first and second surrounding plies 260, 270 to provide the discrete channel elements 31, 32, 33, 34 spaced apart along the channel axis 150. This is specifically by cutting away sections of the respective plies to form the discrete channel elements 31, 32, 33, 34, such as by laser cutting Variations and modifications to the above disclosures within the scope of the appended claims. For instance, while the panel 10 has been described in relation to a wing tip 5 of the aircraft 1, the panel 10 may instead, for example, be a panel of the main wing portion 4 of the wing 3, a panel of the fuselage 2, a panel of a tail plane of the aircraft 1, or a panel of a control surface of the aircraft 1, such as flaps or ailerons. Similarly, the panel 10 may be connected to any other suitable component of the aircraft such as a fuselage structure, or a rib structure of the wing 3 or a tail plane of the aircraft 1. For instance, where the panel 10 is a panel of the main wing portion 4 or a panel of a tail plane, such as a panel of a vertical stabiliser, the panel 10 may be connected to the fuselage 2 to connect the wing 3 and/or vertical stabiliser to the fuselage. In some such examples, the panel 10 may not be articulatable around the joint axis 25.

In some examples, the origin axis 170 may be oblique to the longitudinal axis 160. In addition, while the upper surface 12 of the panel 10 described above is substantially flat and parallel to the longitudinal axis 160, the upper surface 12 may instead be slightly curved along its length in the direction of the longitudinal axis 160 to form a desired aerodynamic surface of the tail plane 3.

The panel 10 may comprise any suitable number of plies. For instance, there may be more than two or just one surrounding ply 260, 270, more than two or just one channel ply 240, 250, and/or more than three or less than three base plies 210, 220, 230. In other examples, there may be no surrounding plies 260, 270. In one example, the panel 10 may consist of a single channel ply 240, 250, or more than one channel ply 240, 250, absent any base plies 210, 220, 230 or surrounding plies 260, 270. In some examples, the composite panel may comprise up to 3, up to 5, or up to 10 plies in total, while in other examples the composite panel may comprise up to or over 100 plies in total.

The first and/or the second channel portions 242, 252 of the respective first and/or second channel plies 240, 250 may be curved up to, or more than, 360 degrees around the channel axis 150. In this way, the first and/or the second channel portions 242, 252 may form a spiral shape when viewed along the channel axis 150. It will be appreciated that any variations to the panel 10 may similarly apply to the alternative panel 40.

In some examples, the origin axis 170 may be oblique to the longitudinal axis 160. In addition, while the upper surface 12 of the panel 10 described above is substantially flat and parallel to the longitudinal axis 160, the upper surface 12 may instead be slightly curved along its length in the direction of the longitudinal axis 160 to form a desired aerodynamic surface of the wing 3.

While the alternative method 500 of manufacturing the alternative ply 30 comprises removing 590 material from the channel 100 once it has been formed, the alternative method 500 may instead comprise removing material from the first and second channel plies 240, 250 to form respective first and second free ends 243, 253 that are shaped, such as castellated, when viewed in the z-direction. The removing the material from the first and second channel plies 240, 250 may be done before the curving the first and second channel plies 240, 250 around the channel axis 150, so that curving the first and second channel plies 240, 250 around the channel axis 150 forms the discrete channel elements 31, 32, 33, 34.

It will be appreciated that any variations to the panel 10 may similarly apply to the alternative panel 40, and that any variations to the method 400 of manufacturing the panel 10 may similarly apply to the alternative method 500 of manufacturing the alternative panel 40.

It is to be noted that the term "or" as used herein is to be interpreted to mean "and/or", unless expressly stated otherwise.

The invention claimed is:

1. An aircraft panel having an upper surface and a lower surface, comprising:
- an inner ply of composite material having a free end,
- wherein the inner ply of composite material is curved around an axis such that the free end of the ply extends more than 180 degrees around the axis defining a wall of an elongated channel opening along the axis and for receiving a hinge member of an aircraft component,
- at least one continuously extending surrounding outer ply of composite material in a laminated arrangement with the inner ply of composite material,
- wherein the at least one continuously extending surrounding outer ply forms
  - the upper surface of the panel,
  - a transition portion,
  - a curved portion that curves around the axis and continuously extends to the transition portion,
  - wherein the transition portion extends to the lower surface of the panel, and
  - wherein the outer ply extends longitudinally along an entire length of the lower surface of the panel.

2. The aircraft panel of claim 1, wherein the upper surface extends in a direction orthogonal to the axis.

3. The aircraft panel of claim 1, wherein the channel is defined at an edge of the aircraft panel.

4. The aircraft panel of claim 1, wherein the inner ply of composite material is curved around the axis such that the free end extends at least 270 degrees around the axis.

5. The aircraft panel of claim 1, wherein the free end of the at least one continuously extending surrounding outer ply extends more than 180 degrees around the axis.

6. The aircraft panel of claim 1, wherein the at least one continuously extending surrounding outer ply has a length in a direction orthogonal to the axis, and the ply is longer than the at least one continuously extending surrounding outer ply in the direction orthogonal to the axis.

7. The aircraft panel of claim 1, wherein the free end of the inner ply comprises cut-outs such that the channel comprises discrete channel elements spaced apart along the axis.

8. The aircraft panel of claim 1, wherein the inner ply of composite material comprises fibres aligned in a direction of curvature of the ply around the axis.

9. An aircraft assembly comprising:
- the aircraft panel of claim 1; and
- the aircraft component comprising the hinge member,
- wherein the hinge member is located in the channel to connect the aircraft component to the aircraft panel.

10. An aircraft wing comprising the aircraft panel of claim 1, wherein the aircraft panel forms an aerodynamic surface of the wing.

11. An aircraft comprising the aircraft assembly of claim 9.

12. A method of manufacturing an aircraft panel having an upper surface and a lower surface, the method comprising;
- providing a inner ply of composite material; and
- curving the inner ply of composite material around an axis such that a free end of the inner ply extends more than 180 degrees around the axis and defines a wall of a channel for receiving a hinge member of an aircraft component,
- providing an at least one continuously extending surrounding outer ply in a laminated arrangement with the inner ply;
- curving the at least one continuously extending surrounding outer ply around the axis so that the at least one continuously extending surrounding outer ply comprises
- the upper surface of the panel,
- a transition portion,
- a curved portion that curves around the axis and continuously extends to the transition portion,
- wherein the transition portion extends to a the lower surface of the panel, and
- wherein the outer ply extends longitudinally along an entire length of the lower surface of the panel.

13. The method of claim 12, further comprising providing a wedge to separate the at least one continuously extending surrounding inner ply from the ply as the at least one continuously extending surrounding outer ply is curved around the axis.

14. The method of claim 12, comprising removing material from the inner ply to form a plurality of channel elements spaced apart along the axis.

15. An aircraft panel manufactured according to the method of claim 12.

* * * * *